(12) United States Patent
Khurana et al.

(10) Patent No.: US 11,619,414 B2
(45) Date of Patent: Apr. 4, 2023

(54) SYSTEM TO PROFILE, MEASURE, ENABLE AND MONITOR BUILDING AIR QUALITY

(71) Applicant: Honeywell International Inc., Morris Plains, NJ (US)

(72) Inventors: Himanshu Khurana, Excelsior, MN (US); Wadnere Hemant Jagannath, Hadapsar (IN); Parthasarathy Chinnachamy, Madurai (IN); Naveen Kumar Dindukurthi Sivaprasad, Bangalore (IN); Zhen Jun Mei, Beijing (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 199 days.

(21) Appl. No.: 16/922,693

(22) Filed: Jul. 7, 2020

(65) Prior Publication Data
US 2022/0011001 A1    Jan. 13, 2022

(51) Int. Cl.
| | |
|---|---|
| *F24F 11/64* | (2018.01) |
| *F24F 11/65* | (2018.01) |
| *G05B 19/042* | (2006.01) |
| *F24F 11/58* | (2018.01) |
| *F24F 11/30* | (2018.01) |

(Continued)

(52) U.S. Cl.
CPC .............. *F24F 11/64* (2018.01); *F24F 11/30* (2018.01); *F24F 11/58* (2018.01); *F24F 11/65* (2018.01); *G05B 19/042* (2013.01); *F24F 2110/00* (2018.01); *F24F 2110/50* (2018.01);
(Continued)

(58) Field of Classification Search
CPC .. F24F 11/64; F24F 11/30; F24F 11/58; F24F 11/65; F24F 11/62; F24F 2110/00; F24F 2110/50; G05B 19/042; G05B 2219/25011; G05B 2219/2614
See application file for complete search history.

(56) References Cited

U.S. PATENT DOCUMENTS

| | | |
|---|---|---|
| 191,512 A | 6/1877 | Bennett et al. |
| 4,009,647 A | 3/1977 | Howorth |

(Continued)

FOREIGN PATENT DOCUMENTS

| | | |
|---|---|---|
| CA | 2387100 A1 | 11/2003 |
| CA | 2538139 A1 | 3/2005 |

(Continued)

OTHER PUBLICATIONS

Best Practices on HVAC Design to Minimize the Risk of COVID-19 Infection within Indoor Environments, Alexandre Fernandex Santos, BABT, vol. 63: e20200335, 2020, https://www.scielo.br/j/babt/a/xPWBJ5hCnKQWJFF7PF6JrXL/?lang=en&format=pdf (Year: 2020).*

(Continued)

*Primary Examiner* — Tarun Sinha
*Assistant Examiner* — Lal C Mang
(74) *Attorney, Agent, or Firm* — Seager, Tufte & Wickhem, LLP (57) ABSTRACT

A system and approach for profiling a building in terms of healthy indoor air quality. A health of the building may be defined and then measured. The process of defining and measuring may be continuous. With an enablement of artificial intelligence, a healthy building operation advisor service may support the process.

18 Claims, 3 Drawing Sheets

(51) Int. Cl.
*F24F 110/00* (2018.01)
*F24F 110/50* (2018.01)
(52) U.S. Cl.
CPC ............... *G05B 2219/25011* (2013.01); *G05B 2219/2614* (2013.01)

(56) References Cited

U.S. PATENT DOCUMENTS

| | | |
|---|---|---|
| 4,375,637 A | 3/1983 | Desjardins |
| 4,918,615 A | 4/1990 | Suzuki et al. |
| 4,939,922 A | 7/1990 | Smalley et al. |
| 5,566,084 A | 10/1996 | Cmar |
| 5,727,579 A | 3/1998 | Chardack |
| 5,745,126 A | 4/1998 | Jain et al. |
| 5,751,916 A | 5/1998 | Kon et al. |
| 5,777,598 A | 7/1998 | Gowda et al. |
| 5,973,662 A | 10/1999 | Singers et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer |
| 6,229,429 B1 | 5/2001 | Horan |
| 6,238,337 B1 | 5/2001 | Kambhatla et al. |
| 6,334,211 B1 | 12/2001 | Kojima et al. |
| 6,353,853 B1 | 3/2002 | Gravlin |
| 6,369,695 B2 | 4/2002 | Horan |
| 6,375,038 B1 | 4/2002 | Daansen et al. |
| 6,429,868 B1 | 8/2002 | Dehner, Jr. et al. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,720,874 B2 | 4/2004 | Fufido et al. |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore et al. |
| 6,882,278 B2 | 4/2005 | Winings et al. |
| 6,904,385 B1 | 6/2005 | Budike, Jr. |
| 6,907,387 B1 | 6/2005 | Reardon |
| 6,911,177 B2 | 6/2005 | Deal |
| 6,993,403 B1 | 1/2006 | Dadebo et al. |
| 6,993,417 B2 | 1/2006 | Osann, Jr. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,110,843 B2 | 9/2006 | Pagnano et al. |
| 7,139,685 B2 | 11/2006 | Bascle et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,111 B1 | 5/2007 | Budike, Jr. |
| 7,222,800 B2 | 5/2007 | Wruck |
| 7,257,397 B2 | 8/2007 | Shamoon et al. |
| 7,280,030 B1 | 10/2007 | Monaco |
| 7,292,908 B2 | 11/2007 | Borne et al. |
| 7,295,116 B2 | 11/2007 | Kumar et al. |
| 7,302,313 B2 | 11/2007 | Sharp et al. |
| 7,308,323 B2 | 12/2007 | Kruk et al. |
| 7,308,388 B2 | 12/2007 | Beverina et al. |
| 7,313,447 B2 | 12/2007 | Hsiung et al. |
| 7,346,433 B2 | 3/2008 | Budike, Jr. |
| 7,356,548 B1 | 4/2008 | Culp et al. |
| 7,379,782 B1 | 5/2008 | Cocco |
| 7,383,148 B2 | 6/2008 | Ahmed |
| 7,434,742 B2 | 10/2008 | Mueller et al. |
| 7,447,333 B1 | 11/2008 | Masticola et al. |
| 7,466,224 B2 | 12/2008 | Ward et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,551,092 B1 | 6/2009 | Henry |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,664,574 B2 | 2/2010 | Imhof et al. |
| 7,682,464 B2 | 3/2010 | Glenn et al. |
| 7,702,421 B2 | 4/2010 | Sullivan et al. |
| 7,729,882 B2 | 6/2010 | Seem |
| 7,755,494 B2 | 7/2010 | Melker et al. |
| 7,761,310 B2 | 7/2010 | Rodgers |
| 7,774,227 B2 | 8/2010 | Srivastava |
| 7,797,188 B2 | 9/2010 | Srivastava |
| 7,819,136 B1 | 10/2010 | Eddy |
| 7,822,806 B2 | 10/2010 | Frank et al. |
| 7,856,370 B2 | 12/2010 | Katta et al. |
| 7,978,083 B2 | 7/2011 | Melker et al. |
| 7,984,384 B2 | 7/2011 | Chaudhri et al. |
| 7,986,323 B2 | 7/2011 | Kobayashi et al. |
| 8,024,666 B2 | 9/2011 | Thompson |
| 8,086,047 B2 | 12/2011 | Penke et al. |
| 8,099,178 B2 | 1/2012 | Mairs et al. |
| 8,151,280 B2 | 4/2012 | Sather et al. |
| 8,176,095 B2 | 5/2012 | Murray et al. |
| 8,218,871 B2 | 7/2012 | Angell et al. |
| 8,219,660 B2 | 7/2012 | McCoy et al. |
| 8,271,941 B2 | 9/2012 | Zhang et al. |
| 8,294,585 B2 | 10/2012 | Barnhill |
| 8,302,020 B2 | 10/2012 | Louch et al. |
| 8,320,634 B2 | 11/2012 | Deutsch |
| 8,334,422 B2 | 12/2012 | Gutsol et al. |
| 8,344,893 B1 | 1/2013 | Drammeh |
| 8,375,118 B2 | 2/2013 | Hao et al. |
| 8,476,590 B2 | 7/2013 | Stratmann et al. |
| 8,516,016 B2 | 8/2013 | Park et al. |
| 8,558,660 B2 | 10/2013 | Nix et al. |
| 8,639,527 B2 | 1/2014 | Rensvold et al. |
| 8,698,637 B2 | 4/2014 | Raichman |
| 8,816,860 B2 | 8/2014 | Ophardt et al. |
| 8,869,027 B2 | 10/2014 | Louch et al. |
| 8,904,497 B2 | 12/2014 | Hsieh |
| 8,936,944 B2 | 1/2015 | Peltz et al. |
| 8,947,437 B2 | 2/2015 | Garr et al. |
| 8,950,019 B2 | 2/2015 | Loberger et al. |
| 9,000,926 B2 | 4/2015 | Hollock et al. |
| 9,030,325 B2 | 5/2015 | Taneff |
| 9,098,738 B2 | 8/2015 | Bilet et al. |
| 9,105,071 B2 | 8/2015 | Fletcher et al. |
| 9,175,356 B2 | 11/2015 | Peltz et al. |
| 9,240,111 B2 | 1/2016 | Scott et al. |
| 9,280,884 B1 | 3/2016 | Schultz et al. |
| 9,292,972 B2 | 3/2016 | Hailemariam et al. |
| 9,320,662 B2 | 4/2016 | Hayes et al. |
| 9,370,600 B1 | 6/2016 | DuPuis et al. |
| 9,373,242 B1 | 6/2016 | Conrad et al. |
| 9,396,638 B2 | 7/2016 | Wildman et al. |
| 9,311,807 B2 | 8/2016 | Schultz et al. |
| 9,406,212 B2 | 8/2016 | De Luca et al. |
| 9,418,535 B1 | 8/2016 | Felch et al. |
| 9,418,536 B1 | 8/2016 | Felch et al. |
| 9,449,219 B2 | 9/2016 | Bilet et al. |
| 9,477,543 B2 | 10/2016 | Henley et al. |
| 9,497,832 B2 | 11/2016 | Verberkt et al. |
| 9,513,364 B2 | 12/2016 | Hall et al. |
| 9,526,380 B2 | 12/2016 | Hamilton et al. |
| 9,526,806 B2 | 12/2016 | Park et al. |
| 9,536,415 B2 | 1/2017 | De Luca et al. |
| 9,558,648 B2 | 1/2017 | Douglas |
| 9,591,267 B2 | 3/2017 | Lipton et al. |
| 9,613,518 B2 | 4/2017 | Dunn et al. |
| 9,618,224 B2 | 4/2017 | Emmons et al. |
| 9,640,059 B2 | 5/2017 | Hyland |
| 9,672,360 B2 | 6/2017 | Barkan |
| 9,710,700 B2 | 7/2017 | Bilet et al. |
| 9,715,242 B2 | 7/2017 | Pillai et al. |
| 9,721,452 B2 | 8/2017 | Felch et al. |
| 9,729,945 B2 | 8/2017 | Schultz et al. |
| 9,784,464 B2 | 10/2017 | Yamamoto et al. |

(56) References Cited

U.S. PATENT DOCUMENTS

| | | | |
|---|---|---|---|
| 9,843,743 B2 | 12/2017 | Lewis et al. | |
| 9,856,634 B2 | 1/2018 | Rodenbeck et al. | |
| 9,872,088 B2 | 1/2018 | Fadell et al. | |
| 9,875,639 B2 | 1/2018 | Bone et al. | |
| 9,911,312 B2 | 3/2018 | Wildman et al. | |
| 9,940,819 B2 | 4/2018 | Ferniany | |
| 9,956,306 B2 | 5/2018 | Brais et al. | |
| 9,986,175 B2 | 5/2018 | Frank et al. | |
| 10,087,608 B2 | 10/2018 | Dobizl et al. | |
| 10,223,894 B2 | 3/2019 | Raichman | |
| 10,228,837 B2 | 3/2019 | Hua et al. | |
| 10,235,865 B2 | 3/2019 | Thyroff | |
| 10,251,610 B2 | 4/2019 | Parthasarathy et al. | |
| 10,303,843 B2 | 5/2019 | Bitran et al. | |
| 10,332,382 B2 | 6/2019 | Thyroff | |
| 10,514,817 B2 | 12/2019 | Hua et al. | |
| 10,565,844 B2 | 2/2020 | Pourmohammad et al. | |
| 10,602,474 B2 | 3/2020 | Goldstein | |
| 10,607,147 B2 | 3/2020 | Raykov et al. | |
| 2002/0111698 A1 | 8/2002 | Graziano et al. | |
| 2002/0130868 A1 | 9/2002 | Smith | |
| 2003/0028269 A1 | 2/2003 | Spriggs et al. | |
| 2003/0030637 A1 | 2/2003 | Grinstein et al. | |
| 2003/0046862 A1 | 3/2003 | Wolf et al. | |
| 2003/0071814 A1 | 4/2003 | Jou et al. | |
| 2003/0078677 A1 | 4/2003 | Hull et al. | |
| 2003/0083957 A1 | 5/2003 | Olefson | |
| 2003/0103075 A1 | 6/2003 | Rosselot | |
| 2003/0171851 A1* | 9/2003 | Brickfield | G05D 11/00 700/286 |
| 2003/0214400 A1 | 11/2003 | Mizutani et al. | |
| 2003/0233432 A1* | 12/2003 | Davis | G06F 15/16 709/222 |
| 2004/0001009 A1 | 1/2004 | Winings et al. | |
| 2004/0064260 A1 | 4/2004 | Padmanabhan et al. | |
| 2004/0143474 A1 | 7/2004 | Haeberle et al. | |
| 2004/0153437 A1 | 8/2004 | Buchan | |
| 2004/0168115 A1 | 8/2004 | Bauernschmidt et al. | |
| 2004/0233192 A1 | 11/2004 | Hopper | |
| 2004/0260411 A1 | 12/2004 | Cannon | |
| 2005/0010460 A1 | 1/2005 | Mizoguchi et al. | |
| 2005/0119767 A1 | 6/2005 | Kiwimagi et al. | |
| 2005/0143863 A1 | 6/2005 | Ruane et al. | |
| 2005/0267900 A1 | 12/2005 | Ahmed et al. | |
| 2006/0004841 A1 | 1/2006 | Heikkonen et al. | |
| 2006/0009862 A1 | 1/2006 | Imhof et al. | |
| 2006/0017547 A1 | 1/2006 | Buckingham et al. | |
| 2006/0020177 A1 | 1/2006 | Seo et al. | |
| 2006/0028471 A1 | 2/2006 | Kincaid et al. | |
| 2006/0029256 A1 | 2/2006 | Miyoshi et al. | |
| 2006/0058900 A1 | 3/2006 | Johanson et al. | |
| 2006/0067545 A1 | 3/2006 | Lewis et al. | |
| 2006/0067546 A1 | 3/2006 | Lewis et al. | |
| 2006/0077255 A1 | 4/2006 | Cheng | |
| 2006/0184326 A1 | 8/2006 | McNally et al. | |
| 2006/0231568 A1 | 10/2006 | Lynn et al. | |
| 2006/0265664 A1 | 11/2006 | Simons et al. | |
| 2006/0279630 A1 | 12/2006 | Aggarwal et al. | |
| 2007/0016955 A1 | 1/2007 | Goldberg et al. | |
| 2007/0055757 A1 | 3/2007 | Mairs et al. | |
| 2007/0055760 A1 | 3/2007 | McCoy et al. | |
| 2007/0061046 A1 | 3/2007 | Mairs et al. | |
| 2007/0067062 A1 | 3/2007 | Mairs et al. | |
| 2007/0088534 A1 | 4/2007 | MacArthur et al. | |
| 2007/0090951 A1 | 4/2007 | Chan et al. | |
| 2007/0091091 A1 | 4/2007 | Gardiner et al. | |
| 2007/0101433 A1 | 5/2007 | Louch et al. | |
| 2007/0114295 A1 | 5/2007 | Jenkins | |
| 2007/0120652 A1 | 5/2007 | Behnke | |
| 2007/0139208 A1 | 6/2007 | Kates | |
| 2007/0216682 A1 | 9/2007 | Navratil et al. | |
| 2007/0219645 A1 | 9/2007 | Thomas et al. | |
| 2007/0239484 A1 | 10/2007 | Arond et al. | |
| 2007/0268122 A1 | 11/2007 | Kow et al. | |
| 2008/0001763 A1 | 1/2008 | Raja et al. | |
| 2008/0027885 A1 | 1/2008 | Van Putten et al. | |
| 2008/0036593 A1 | 2/2008 | Rose-Pehrsson et al. | |
| 2008/0062167 A1 | 3/2008 | Boggs et al. | |
| 2008/0099045 A1 | 5/2008 | Glenn et al. | |
| 2008/0103798 A1 | 5/2008 | Domenikos et al. | |
| 2008/0120396 A1 | 5/2008 | Jayaram et al. | |
| 2008/0144885 A1 | 6/2008 | Zucherman et al. | |
| 2008/0183424 A1 | 7/2008 | Seem | |
| 2008/0194009 A1 | 8/2008 | Marentis | |
| 2008/0198231 A1 | 8/2008 | Ozdemir et al. | |
| 2008/0209342 A1 | 8/2008 | Taylor et al. | |
| 2008/0222565 A1 | 9/2008 | Taylor et al. | |
| 2008/0224862 A1 | 9/2008 | Cirker | |
| 2008/0242945 A1 | 10/2008 | Gugliotti et al. | |
| 2008/0250800 A1 | 10/2008 | Wetzel | |
| 2008/0279420 A1 | 11/2008 | Masticola et al. | |
| 2008/0280275 A1 | 11/2008 | Collopy | |
| 2008/0303658 A1 | 12/2008 | Melker et al. | |
| 2008/0306985 A1 | 12/2008 | Murray et al. | |
| 2008/0320552 A1 | 12/2008 | Kumar et al. | |
| 2009/0001181 A1 | 1/2009 | Siddaramanna et al. | |
| 2009/0024944 A1 | 1/2009 | Louch et al. | |
| 2009/0065596 A1 | 3/2009 | Seem et al. | |
| 2009/0083120 A1 | 3/2009 | Strichman et al. | |
| 2009/0096791 A1 | 4/2009 | Abshear et al. | |
| 2009/0125337 A1 | 5/2009 | Abr | |
| 2009/0125825 A1 | 5/2009 | Rye et al. | |
| 2009/0144023 A1 | 6/2009 | Seem | |
| 2009/0157744 A1 | 6/2009 | McConnell | |
| 2009/0160673 A1 | 6/2009 | Cirker | |
| 2009/0322782 A1 | 12/2009 | Kimchi et al. | |
| 2010/0048167 A1 | 2/2010 | Chow et al. | |
| 2010/0058248 A1 | 3/2010 | Park | |
| 2010/0064001 A1 | 3/2010 | Daily | |
| 2010/0070089 A1 | 3/2010 | Harrod et al. | |
| 2010/0073162 A1 | 3/2010 | Johnson et al. | |
| 2010/0123560 A1 | 5/2010 | Nix et al. | |
| 2010/0134296 A1 | 6/2010 | Hwang | |
| 2010/0156628 A1 | 6/2010 | Ainsbury et al. | |
| 2010/0156630 A1 | 6/2010 | Ainsbury | |
| 2010/0188228 A1 | 7/2010 | Hyland | |
| 2010/0223198 A1 | 9/2010 | Noureldin et al. | |
| 2010/0249955 A1 | 9/2010 | Sitton | |
| 2010/0286937 A1* | 11/2010 | Hedley | G01R 21/00 702/60 |
| 2010/0298981 A1* | 11/2010 | Chamorro | G05B 15/00 700/276 |
| 2010/0318200 A1 | 12/2010 | Foslien et al. | |
| 2010/0324962 A1 | 12/2010 | Nesler et al. | |
| 2011/0010654 A1 | 1/2011 | Raymond et al. | |
| 2011/0057799 A1 | 3/2011 | Taneff | |
| 2011/0077779 A1 | 3/2011 | Fuller et al. | |
| 2011/0083094 A1 | 4/2011 | Laycock et al. | |
| 2011/0087988 A1 | 4/2011 | Ray et al. | |
| 2011/0112854 A1 | 5/2011 | Koch et al. | |
| 2011/0126111 A1 | 5/2011 | Gill et al. | |
| 2011/0154426 A1 | 6/2011 | Doser et al. | |
| 2011/0161124 A1 | 6/2011 | Lappinga et al. | |
| 2011/0169646 A1 | 7/2011 | Raichman | |
| 2011/0184563 A1 | 7/2011 | Foslien et al. | |
| 2011/0202467 A1 | 8/2011 | Hilber et al. | |
| 2011/0273298 A1 | 11/2011 | Snodgrass et al. | |
| 2011/0291841 A1 | 12/2011 | Hollock et al. | |
| 2011/0298301 A1 | 12/2011 | Wong et al. | |
| 2011/0316703 A1 | 12/2011 | Butler et al. | |
| 2011/0320054 A1 | 12/2011 | Brzezowski | |
| 2012/0022700 A1 | 1/2012 | Drees et al. | |
| 2012/0039503 A1 | 2/2012 | Chen et al. | |
| 2012/0062382 A1 | 3/2012 | Taneff | |
| 2012/0075464 A1 | 3/2012 | Derenne et al. | |
| 2012/0109988 A1 | 5/2012 | Li et al. | |
| 2012/0112883 A1 | 5/2012 | Wallace et al. | |
| 2012/0131217 A1 | 5/2012 | Delorme et al. | |
| 2012/0158185 A1 | 6/2012 | El-Mankabady et al. | |
| 2012/0216243 A1 | 8/2012 | Gill et al. | |
| 2012/0224057 A1 | 9/2012 | Gill et al. | |
| 2012/0259466 A1 | 10/2012 | Ray et al. | |
| 2012/0259469 A1* | 10/2012 | Ward | G05B 13/00 700/276 |

(56) References Cited

U.S. PATENT DOCUMENTS

| | | |
|---|---|---|
| 2012/0262472 A1 | 10/2012 | Garr et al. |
| 2012/0272146 A1 | 10/2012 | D'souza et al. |
| 2012/0291068 A1 | 11/2012 | Khushoo et al. |
| 2012/0303652 A1 | 11/2012 | Tseng |
| 2012/0310418 A1 | 12/2012 | Harrod et al. |
| 2013/0055132 A1 | 2/2013 | Foslien |
| 2013/0060794 A1 | 3/2013 | Puttabasappa et al. |
| 2013/0082842 A1 | 4/2013 | Balazs et al. |
| 2013/0086152 A1 | 4/2013 | Hersche et al. |
| 2013/0091631 A1 | 4/2013 | Hayes et al. |
| 2013/0110295 A1 | 5/2013 | Zheng et al. |
| 2013/0169681 A1 | 7/2013 | Rasane et al. |
| 2013/0184880 A1 | 7/2013 | McMahon |
| 2013/0187775 A1 | 7/2013 | Marsden et al. |
| 2013/0204570 A1 | 8/2013 | Mendelson et al. |
| 2013/0229276 A1 | 9/2013 | Hunter |
| 2013/0268293 A1 | 10/2013 | Knudson et al. |
| 2013/0289774 A1 | 10/2013 | Day et al. |
| 2014/0032157 A1 | 1/2014 | Khiani |
| 2014/0040998 A1 | 2/2014 | Hsieh |
| 2014/0046490 A1 | 2/2014 | Foslien et al. |
| 2014/0046722 A1 | 2/2014 | Rosenbloom et al. |
| 2014/0058539 A1 | 2/2014 | Park |
| 2014/0167917 A2 | 6/2014 | Wallace et al. |
| 2014/0207291 A1 | 7/2014 | Golden et al. |
| 2014/0292518 A1 | 10/2014 | Wildman et al. |
| 2014/0307076 A1 | 10/2014 | Deutsch |
| 2014/0309757 A1 | 10/2014 | Le Sant et al. |
| 2014/0316582 A1* | 10/2014 | Berg-Sonne ........... G05D 23/19 700/276 |
| 2014/0320289 A1 | 10/2014 | Raichman |
| 2014/0342418 A1 | 11/2014 | Hill et al. |
| 2015/0025329 A1 | 1/2015 | Amarasingham et al. |
| 2015/0032264 A1 | 1/2015 | Emmons et al. |
| 2015/0056909 A1 | 2/2015 | Chien |
| 2015/0070174 A1 | 3/2015 | Douglas |
| 2015/0077258 A1 | 3/2015 | Nelson et al. |
| 2015/0113462 A1 | 4/2015 | Chen et al. |
| 2015/0153918 A1 | 6/2015 | Chen et al. |
| 2015/0161874 A1 | 6/2015 | Thyroff et al. |
| 2015/0167995 A1 | 6/2015 | Fadell et al. |
| 2015/0168949 A1 | 6/2015 | Hua et al. |
| 2015/0194043 A1 | 7/2015 | Dunn et al. |
| 2015/0198707 A1 | 7/2015 | Al-Alusi |
| 2015/0212717 A1 | 7/2015 | Nair et al. |
| 2015/0213222 A1 | 7/2015 | Amarasingham et al. |
| 2015/0213379 A1 | 7/2015 | Nair et al. |
| 2015/0216369 A1 | 8/2015 | Hamilton et al. |
| 2015/0253748 A1 | 9/2015 | Brun et al. |
| 2015/0281287 A1 | 10/2015 | Gill et al. |
| 2016/0061469 A1* | 3/2016 | Albonesi ................ F24F 11/006 |
| 2016/0061476 A1 | 3/2016 | Schultz et al. |
| 2016/0061477 A1 | 3/2016 | Schultz et al. |
| 2016/0061794 A1 | 3/2016 | Schultz et al. |
| 2016/0061795 A1 | 3/2016 | Schultz et al. |
| 2016/0063833 A1 | 3/2016 | Schultz et al. |
| 2016/0066067 A1 | 3/2016 | Schultz et al. |
| 2016/0116181 A1 | 4/2016 | Aultman et al. |
| 2016/0139067 A1 | 5/2016 | Grace |
| 2016/0253897 A1 | 9/2016 | Wildman et al. |
| 2016/0255516 A1 | 9/2016 | Hill et al. |
| 2016/0298864 A1 | 10/2016 | Ekolind et al. |
| 2016/0306934 A1 | 10/2016 | Sperry et al. |
| 2016/0314683 A1 | 10/2016 | Felch et al. |
| 2016/0328948 A1 | 11/2016 | Ferniany |
| 2016/0335731 A1 | 11/2016 | Hall |
| 2016/0367925 A1 | 12/2016 | Blackley |
| 2017/0024986 A1 | 1/2017 | Austin |
| 2017/0193792 A1 | 7/2017 | Bermudez Rodriguez et al. |
| 2017/0256155 A1 | 9/2017 | Sengstaken, Jr. |
| 2017/0280949 A1 | 10/2017 | Wildman et al. |
| 2017/0294106 A1 | 10/2017 | Thyroff |
| 2017/0365024 A1 | 12/2017 | Koch et al. |
| 2018/0016773 A1 | 1/2018 | Chandler et al. |
| 2018/0151054 A1 | 5/2018 | Pi |
| 2018/0218591 A1 | 8/2018 | Easter |
| 2018/0293038 A1 | 10/2018 | Meruva et al. |
| 2018/0301014 A1 | 10/2018 | Worral et al. |
| 2018/0313695 A1 | 11/2018 | Shim et al. |
| 2018/0365957 A1 | 12/2018 | Wright et al. |
| 2019/0051138 A1 | 2/2019 | Easter |
| 2019/0139395 A1 | 5/2019 | Rogachev et al. |
| 2019/0209719 A1 | 7/2019 | Andersen et al. |
| 2020/0009280 A1 | 1/2020 | Kupa et al. |
| 2020/0074836 A1 | 3/2020 | Kolavennu et al. |
| 2020/0090089 A1 | 3/2020 | Aston et al. |
| 2020/0146557 A1 | 5/2020 | Cheung et al. |
| 2020/0162354 A1* | 5/2020 | Drees .................... H04L 43/065 |
| 2020/0200420 A1 | 6/2020 | Nayak et al. |

FOREIGN PATENT DOCUMENTS

| | | |
|---|---|---|
| CN | 103110410 A | 5/2013 |
| CN | 103970977 A | 8/2014 |
| CN | 105116848 A | 12/2015 |
| CN | 108961714 A | 12/2018 |
| CN | 110009245 A | 7/2019 |
| CN | 110084928 A | 8/2019 |
| CN | 110827457 A | 2/2020 |
| EP | 1669912 A1 | 6/2006 |
| EP | 2310981 A1 | 4/2011 |
| JP | 7085166 A | 3/1995 |
| JP | 11024735 A | 1/1999 |
| JP | 11317936 A | 11/1999 |
| JP | 2001356813 A | 12/2001 |
| JP | 2005242531 A | 9/2005 |
| JP | 2005311563 A | 11/2005 |
| KR | 1172747 B1 | 8/2012 |
| KR | 101445367 B1 | 10/2014 |
| KR | 1499081 B1 | 3/2015 |
| WO | 9621264 A3 | 11/1996 |
| WO | 2004029518 A1 | 4/2004 |
| WO | 2005045715 A2 | 5/2005 |
| WO | 2008152433 A1 | 12/2008 |
| WO | 2008157755 A1 | 12/2008 |
| WO | 2009012319 A2 | 1/2009 |
| WO | 2009079648 A1 | 6/2009 |
| WO | 2010106474 A1 | 9/2010 |
| WO | 2011025085 A1 | 3/2011 |
| WO | 2011043732 A1 | 4/2011 |
| WO | 2011057173 A2 | 5/2011 |
| WO | 2011123743 A1 | 10/2011 |
| WO | 2013062725 A1 | 5/2013 |
| WO | 2013178819 A1 | 12/2013 |
| WO | 2014009291 A1 | 1/2014 |
| WO | 2014098861 A1 | 6/2014 |
| WO | 2014135517 A1 | 9/2014 |
| WO | 2016123536 A1 | 8/2016 |
| WO | 2017057274 A1 | 4/2017 |
| WO | 2019046580 A1 | 3/2019 |
| WO | 2020024553 A1 | 2/2020 |

OTHER PUBLICATIONS

"Energy Manager User Guide," Release 3.2, Honeywell, 180 pages, 2008.
"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
Honeywell, "Product Guide 2004," XP-002472407, 127 pages, 2004.
"Statistics Toolbox, for Use with Matlab," User's Guide Version2, The MathWorks, 408 pages, Jan. 1999.
"Vykon Energy Suite Student Guide," Tridium Inc., 307 pages, Mar. 3, 2006.
"Web Based Energy Information Systems for Energy Management and Demand Response in Commercial Buildings," California Energy Commission, 80 pages, Oct. 2003.

(56) References Cited

OTHER PUBLICATIONS

Andover Controls, Network News, vol. 2, No. 2, 8 pages, 1997.
Andover Controls World, 4 pages, Spring 1997.
Bell, Michael B. et al., "Early Event Detection-Results from a Prototype Implementation," AICHE Spring National Meeting, 15 pages, Apr. 2005.
CADGraphics, "The CADGraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chen, Tony. F., "Rank Revealing QR Factorizations," Linear Algebra and It's Applications, vol. 88-89, p. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor—Integrated R7044 and FS90 Ver. 2.0," Operator Manual, 70 pages, Apr. 1995.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . , "Remote Building Monitoring and Operations Home Page," 5 pages, prior to Aug. 27, 2007.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . , "Carrier: 33CSCCNWEB-01 Ccn Web Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights on a Wireless Lighting Control System," 11 pages, printed Mar. 22, 2007.
I-Lon 100e3 Internet Server, 1 page, prior to Aug. 27, 2007.
I-Lon, SmartServer, 2 pages, prior to Aug. 27, 2007.
I-stat, Demo Screen Shots, 9 pages, printed Mar. 13, 2007.
I-stat, The Internet Programmable Thermostat, 2 pages, prior to Aug. 27, 2007.
Jeffrey Ball, "Green Goal of 'Carbon Neutrality' Hits Limit," TheWall Street Journal, 7 pages, Dec. 30, 2008.
Johnson Controls, Network Integration Engine (NIE) 3 pages, Nov. 9, 2007.
Johnson Controls, Network Integration Engine (NIE), Product Bulletin, pp. 1-11, Jan. 30, 2008.
Kourti, Theodora, "Process Analysis and Abnormal Situation Detection: From Theory to Practice," IEEE Control Systems Magazine, p. 10-25, Oct. 2002.
Mathew, Paul A., "Action-Oriented Benchmarking, Using CEUS Date to Identify and Prioritize Efficiency Opportunities in California Commercial Buildings," 26 pages, Jun. 2007.
Morrison, Don et al., "The Early Event Detection Toolkit," Honeywell Process Solutions, 14 pages, Jan. 2006.
Narang, "WEBARC: Control and Monitoring of Building Systems Over the Web," 53 pages, May 1999.
Juliana Bocicor et al. "Wireless Sensor Network based System for the Prevention of Hospital Acquired Infections", arxiv.org, Cornell University Ithaca, NY 14853, May 2, 2017, XP080947042, (Abstract).
Shhedi Zaid Ali et al., "Traditional and ICT Solutions for Preventing the Hospital Acquired Infection", 2015 20th International Conference on Control Systems and Computer Science, IEEE, May 27, 2015, pp. 867-873, XP033188038.
Extended European Search Report, EP application No. 20151295.1, pp. 13, dated May 26, 2020.
U.S. Appl. No. 14/109,496, filed Dec. 17, 2013.
www.geappliances.com/home-energy-manager/about-energy-monitors.htm, "Energy Monitor, Home Energy Monitors, GE Nucleus," 2 pages, printed Jan. 15, 2013.
www.luciddesigngroup.com/network/apps.php#homepage, "Lucid Design Group—Building Dashboard Network—Apps," 7 pages, Jan. 15, 2013.
Preuveneers et al., "Intelligent Widgets for Intuitive Interaction and Coordination in Smart Home Environments," IEEE Eighth International Conference on Intelligent Environments, pp. 157-164, 2012.
Wu et al., "A Web 2.0 Based Scientific Application Framework," 7 pages, prior to Jul. 24, 2014.
"4.0 Today's Activities, The Home Dashboard," CRBM info@hand website, 46 pages, prior to Apr. 25, 2013.
"Free Facilities Dashboards," eSight Energy Website, 2 pages, prior to Apr. 25, 2013.
Alerton Building Controls, Gallery Prints, 7 pages, Dec. 19, 2013.
Carter, "Industrial Energy Management Dashboards Require a Toolkit," Cross Automation, 11 pages, Nov. 4, 2013.
U.S. Appl. No. 14/169,071, filed Jan. 30, 2014.
U.S. Appl. No. 14/169,083, filed Jan. 30, 2014.
U.S. Appl. No. 14/461,188, filed Aug. 15, 2014.
U.S. Appl. No. 14/482,607, filed Sep. 10, 2014.
e-homecontrols.com, "e-Home Controls Website," link to actual website no longer works, 1 page, prior to Dec. 19, 2013.
http://www.ccbac.com, "C&C (/)—Omniboard," 5 pages, Dec. 19, 2013.
http://www.domcontroller.com/en/, "DomController Home Automation Software—Control Anything from Anywhere," 11 pages, printed Jan. 6, 2015.
http://www.novar.com/ems-bas/opus-building-automation-system, "Novar OPUS BAS," 1 page, prior to Feb. 13, 2013.
Instituto Superior Tecnico, "A 3D Interactive Environment for Automated Building Control," Master's Dissertation, 120 pages, Nov. 2012.
Panduit Corp., "Enable a Building Automation with Panduit Enterprise Solutions," 4 pages, Nov. 2012.
"WEBs-AX Web-Enabled Building Solutions," sales brochure, Honeywell International Inc., Mar. 2009.
"Attune Advisory Services," press release, Honeywell International Inc., Mar. 20, 2012.
EnteliWEB product from Delta Controls, web pages retrieved on May 9, 2013 from http://deltacontrols.com/products/facilities-management/supervisory-software et seq. by the Internet Archive at web.archive.org.

(56) References Cited

OTHER PUBLICATIONS

"BACnet Protocol Implementation Conformance Statement" for enteliWEB, Delta Controls, Jul. 17, 2013.
Castle, "7 Software Platforms that Make Building Energy Management Easy," http://greentechadvocates.com/2012/11/28/7-software-platforms-that-make-building-energy-managment-easy/, Nov. 28, 2012.
EnteliWEB catalog sheet, Delta Controls, Inc., 2012.
EnteliWEB catalog sheet, Delta Controls., 2010.
"Intelligent Building Management Systems in Miami," Advanced Control Corp., Mar. 7, 2013.
"The Ohio State University," BACnet International Journal, vol. 5, p. 4, Jan. 2013.
Bobker et al., "Operational Effectiveness in Use of BAS," Proceedings of the 13th International Conference for Enhanced Building Operations, Oct. 8, 2013.
Castelo, "A 3D Interactive Environment for Automated Building Control," Elsevier, Nov. 8, 2012.
"Creston Special Report: How Intelligent building management solutions are reducing operational costs," Creston, 2012.
"Building Automation Software Solutions," Iconics, 2013.
Lacey, "The Top 10 Software Vendors Connecting Smart Buildings to the Smart Grid," http://www.greentechmedia.com/articles/read/the-top-10-companies-in-enterprise-smart-grid, Jul. 18, 2013.
"NiagraAX Product Model Overview," Tridium, Inc., 2005.
"An Overview of NiagraAX: A comprehensive software platform designed to create smart device applications," Tridium, Inc., 2005.
"Phoenix Controls Portal," Phoenix Controls, Inc., 2013.
Quirk, "A Brief History of BIM," Arch Daily, Dec. 7, 2012.
Samad et al., "Leveraging the Web: A Universal Framework for Building Automation," Proceedings of the 2007 American Control Conference, Jul. 11, 2007.
Sinha et al., "9 Key attributes of energy dashboards and analytics tools," https://www.greenbiz.com/blog/2013/08/28/9-key-attributes-energy-dashboards-and=analytics-tools, Aug. 28, 2013.
Sinopoli, "Dashboards for Buildings," http://www/automatedbuildings.com/news/dec10/articles/sinopoli/101119034404sinopoli.html, Dec. 2010.
Sinopoli, "Modeling Building Automation and Control Systems," http://www.automatedbuildings.com/news/jun13/articles/sinopoli/130521122303sinopoli.html, Jun. 2013.
Zito, "What is Tridium Part 1," http://blog.buildingautomationmonthly.com/what-is-tridium/, May 12, 2013.
Zito, "What is Tridium Part 2," http://blog.buildingautomationmonthly.com/tridium-part-2/, Sep. 10, 2013.
Search Report and Written Opinion from related International PCT Application No. PCT/US2018/025189 dated Jul. 17, 2018 (12 pages).
"Data analytics and smart buildings increase comfort and energy efficiency", https://www.microsoft.com/itshowcase/Article/Content/845/Data-analytics-and-smart-buildings-increase-comfort-and-energy-efficiency, Dec. 19, 2016, 8 pages.
Donnelly, "Building Energy Management: Using Data as a Tool", http://www.buildingefficiencyinitiative.org/sites/default/files/legacy/InstituteBE/media/Library/Resources/Existing-Building-Retrofits/Using-Building-Data-as-a-Tool.pdf, Oct. 2012, 9 pages.
"ASHRAE Dashboard Research Project," 29 pages, Aug. 28, 2008.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Richard Rogan et al., "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.
So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.
Lucid Design Group, Inc., "Building Dashboard," 2 pages, Printed May 30, 2013.
"America's Largest Managed Security Services Provider Launches Comprehensive, Integrated Covid-19 Safety Program for Office Buildings and Suites," KastleSafeSpaces, 5 pages, May 11, 2020.
"Biometric Door Reader With Body Temperature Detection," Kintronics, 9 pages, accessed May 21, 2020.
"Body Surface Temperature Screening with Alarm Function TVS-200IS/TVS-500IS," Nippon Avionics Co., 3 pages, accessed May 21, 2020.
"BriefCam announces video analytics innovation for contact tracing, physical distancing, occupancy management and face mask detection," BriefCam LTD, 11 pages, Jun. 5, 2020.
"Thermal Imaging SmartPhone Can be used for Temperature Screening of People," CAT, 3 pages, accessed Jul. 13, 2020.
"Contact Tracing Now Available on Identiv's Hirsch Velocity Access Control Platform," IDENTIV, 5 pages, May 21, 2020.
Silva et al., "Cough localization for the detection of respiratory diseases in pig houses," ScienceDirect, 7 pages, May 28, 2008.
Oey et al., "Evaluation of Isolation Compliance Using Real Time Video in Critical Care," North Shore University Hospital, 1 page, Oct. 9, 2015.
"Facial Attendace System With Temperature Screening Now in India," IANS, 5 pages, Mar. 19, 2020.
"Plan to Re-Open," EHIGH, 16 pages, accessed Jun. 13, 2020.
"How Smarter AI-Powered Cameras Can Mitigate the Spread of Wuhan Novel," AnyConnect, 22 pages, 2020.
"How to fight COVID-19 with machine learning," DataRevenue, 20 pages, accessed May 25, 2020.
"INNControl 5," Honeywell, 2 pages, Aug. 8, 2018.
"IP Door Access Control," Kintronics, 21 pages, 2014.
"Kogniz AI Health Response Platform," Kogniz, 9 pages, accessed May 21, 2020.
"Machine Learning Could Check if You're Social Distancing Properly at Work," MIT Technology Review, 7 pages, Apr. 17, 2020.
Punn et al., "Monitoring COVID-19 social distancing with person detection and tracking via fine-tuned YOLO v3 and Deepsort techniques," 10 pages, May 6, 2020.
"NEC launches dual face biometric and fever detection system for access control," Biometric Update, 4 pages, May 8, 2020.
"Remote temperature monitoring," AXIS Communication, 10 pages, 2014.
"FebriEye-AI Based Thermal Temperature Screening System," vehant, 1 page, 2020.
"See the World in a New Way Hikvision Thermal Cameras," Hikvision, 12 pages, 2017.
Allain, "Trying out the iPhone Infrared Camera: The FLIR One," Wired, 15 pages, 2014.
Dasgupta, "Your voice may be able to tell you if you have Covid," Hindustan Times, 4 pages, Apr. 16, 2020.
Ganguty, "Gurugram-based startup Staqu has modified AI-powered JARVIS to battle coronavirus," YourStory, 7 pages, Mar. 31, 2020.

\* cited by examiner

SYSTEM TO PROFILE, MEASURE, ENABLE AND MONITOR BUILDING AIR QUALITY

BACKGROUND

The present disclosure pertains to an area concerning healthy facilities.

SUMMARY

The disclosure reveals a system and approach for profiling a building in terms of healthy indoor air quality. A health of the building may be defined and then measured. The process of defining and measuring may be continuous. With an enablement of artificial intelligence, a healthy building operation advisor service may support the process.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The disclosure concerns a highly efficient system solution to profile, measure and artificial intelligence (AI) enable continuous monitor building indoor air quality (IAQ) to meet American Society of Heating, Refrigeration and Air-Conditioning Engineers (ASHRAE) coronavirus disease 2019 (COVID-19) guidelines from a building owner/facility management perspective, preparing workplaces and facilities to re-open whilst COVID-19 still exists in the community and reassuring employees, customers and visitors that a building, from offices and schools to airports and hotels, is healthy will be critical.

Building heating, ventilation and air conditioning (HVAC) system design: building owner/facility may have virtually no immediate knowledge whether a current HVAV system design supports the health building improvement to their HVAC systems, higher ventilation rates, airflow, filtration, increased filter cleaning/replacement, and so on.

Building healthy measurement may be noted. The occupant experience is not necessarily going to be measured by personal temperature preferences but by trust that the building is nurturing a healthy environment. And for a building owner/facility manager, both lack of a "Now" view how the building HVAC system has compliance with COVID19/healthy building guidance.

Health building continuous operation may be noted. For building facility management, a lack of an efficient way to maintain and operation building at the health building guidance, and lack of view of how efficiently to manage the system, where current gaps and where the potential risks are, should be known.

One may introduce a highly efficient system solution-to profile, measure an AI enabled continuous monitor building IAQ to meet ASHRAE COVID-19 guidelines, which enables our offering and service capability to win customers or help existing customers maintain and operate a building in a healthy status. A solution may include the following items: 1) A healthy building profiling system; 2) A healthy building measurement system; 3) An AI enabled healthy building measurement forecast and advisor service; 4) A healthy building operation strategy management; 5) A user friendly user interface (UI) to configure/display system-based healthy building operation strategies; and 6) A user friendly UI for healthy building measurement/forecast awareness dashboard for both building facility management and occupants (including tenants, visitors and others).

A solution may consist of the following features. 1) There may be a healthy building profile and measurement. 2) Healthy building definition and measurement. 2.1) There may be an AI enabled healthy building operation advisor service. An advisor service may generate a healthy building measurement forecast, generate operation guidelines for the profile defined, and generate operation strategy and activate a new strategy. 2.2) There may be a healthy building advisor service and continuous operation. 2.2.1) A building autonomous operation advisor service may be connected to a headend/BMS system and adaption. The advisor service may generate performance metrics and operation limits, and real-time track and operate as per above. 2.2.2) A cloud enabled operation: building may subscribe to an online advisor service. There may be a connection from a field headend or building management system (BMS) to a cloud advisor service. An advisor service may generate and confirm healthy operation performance metrics and operation guidelines, and notification limits. The advisor service may real-time track and operate per above. 2.2.3) A remote service: offline advisor service may initialize with building HVAC history operation data (e.g., 3+ months). An offline advisor service may generate and confirm healthy operation performance metrics and operation guidelines, and notification limits. A remote operator may periodically sync building HVAC operation data. The advisor service may real-time track and generate operation notifications. A remote operator may connect to a building BMS and apply changes as needed or desired. 3) A healthy building advisor service operation strategy may involve a rule engine, schedule queue, schedule execution engine, active schedule subscription from schedule queue, getting schedule data and executing set point.

A complete healthy building profiling system may cover a system from static design to dynamic running characteristics to meet ASHRAE COVID-19 guidelines. There may be a healthy building profiling via manual inputs, healthy building profiling via building HW drawing scan, and healthy building profiling via BMS graphics and configuration readings.

A healthy building measurement system may be noted. There may be a healthy building measurement/score system to support a measure of compliance of meeting ASHRAE COVID-19 guidelines. There may be a healthy building measurements baseline and benchmarking, and a healthy building gaps identification and suggestions.

An AI enabled building healthy measurement forecast and advisor service may be noted. There may be a building healthy measurement forecast based predicted HVAC system performance indicator, and a building healthy measurement forecast based on predicted HVAC asset/equipment performance indicator.

Healthy building operation strategy management may be noted. There may be a healthy building operation strategy definition for a pre-check mode, running mode, normal mode, and so on. There may be an enable/disable healthy building operation strategy, a rules engine to calculate a healthy system operation mode, on/off, operation mode, and so forth. The rules engine may take on working schedules like building operation schedules. There may be rules to define a default operation strategy, rules to define active operation strategy, and rules to define backup operation strategies.

A user friendly UI may be used to configure/display a system-based healthy building operation strategies. The user friendly UI may have a healthy building measurement/ forecast awareness dashboard for both building facility management and occupants (including tenants, visitors, and so on).

A solution architecture may consist of a healthy building profile and measurement. Healthy building profiling may include a healthy building profile template and definition. A technician may input the building profile manually and the system may save data in the system, or the technician may scan a building hardware (HW) drawing to interpret a system profile and save data in the system, or the technician may connect the system to a running head-end system to read graphics and configurations and save profile data in the system.

Healthy building definition and measurement may include a health building score system and a healthy building measure engine that measures a building healthy status via reading the latest building profile data.

There may be a healthy building continuous operation. One operation may be an AI enabled healthy building operation advisor service. The service may incorporate an HVAC system and equipment health index quantification, data analytics and machine learning for system/equipment health prediction, an expert system for alarm generation and notification, a building ontology model for standardized deployment, an advisor service that generates a healthy building measurement forecast, an advisor service that generates an operation guideline per a profile defined, and advisor service that generate an operation strategy and activates a new strategy.

Another operation may be healthy building advisor service and continuous operation that includes a building autonomous operation, cloud enabled operation, and a remote service.

The building autonomous operation may incorporate an advisor service that connects to headend/BMS system and adaption, an advisor service that generates healthy operation performance metrics and operation limits, and an advisor service that real-time tracks and operates per above.

The cloud enabled operation may include a building that subscribes an online advisor service, a connection from a field headend/BMS system to a cloud advisor service, an advisor service that generates and confirms healthy operation performance metrics and operation guidelines and notification limits, and an advisor service that real-time tracks and operates per above.

The remote service may incorporate an offline advisor service that initializes with building HVAC history operation data (e.g., 3+ months), an offline advisor service that generates and confirms healthy operation performance metrics and operation guidelines, and notification limits, a remote operator that periodically syncs building HVAC operation data, an advisor service that real-time tracks and generates an operation notification, and a remote operator that connects to a building BMS and applies changes.

There may a healthy building advisor service operation strategy that includes a rule engine, schedule queue, and a schedule execution engine. The rule engine may incorporate in the present solution "Drools" as a business rule engine, points, operation schedules, and variable data that will be inserted into the rule engine as facts, apply rules to generate a schedule, and put the schedule into a queue. The schedule queue may use, in the present solution, an active message queuing (MQ) as a distributed queue. A schedule execution engine may have an active schedule subscription from a schedule queue, and get schedule data and execute a set point.

The present system and approach are about, while profiling the building, one may consider both indoor parameters (e.g., occupancy rate, space usage) and outdoor parameters (e.g., location, and density of buildings). These parameters may relate to air quality.

The present system and approach as described in the present specification, along with the Figures and claims, may be implemented with hardware where possible and/or practical. For example, the system and approach may utilize a controller incorporating a processor, memory, user interface with a keyboard, display, a touch screen and/or the like. The IAQ may be covered by a device designed to detect ingredients or substances that are associated with COVID-19 or a component of COVID-19, or other ingredient or substance indicative of an unhealthy environment, air, building, or the like. The IAQ and/or outside air quality (OAQ) may be detected, profiled and/or measured with hardware such as sensors, monitors, and the like. Analyses involving detection and identification of unhealthy or healthy substances in the air may be achieved with available hardware and/or software along with algorithms applicable to an analysis at hand. HVACs may have control electronics, and sets of heaters, air conditioners, ventilators, filters, vents, dampers, sensors, and actuators to manage health of the air in the buildings. The OAQ may be monitored in order to better control the IAQ. These items and additional items related to the air quality tasks may be managed by a building management system (BMS). The BMS may have processor, memory, user interface with a keyboard, display, a touch screen and/or the like. The memory may hold applicable algorithms that may be entered manually or downloaded from various sources. The BMS may be integrated with the HVAC. The BMS, or similar hardware, and software items may be integrated on-line and/or off-line relative to a cloud, internet and/or the like. Connections and interconnections may wired and/or wireless.

Figure 1:
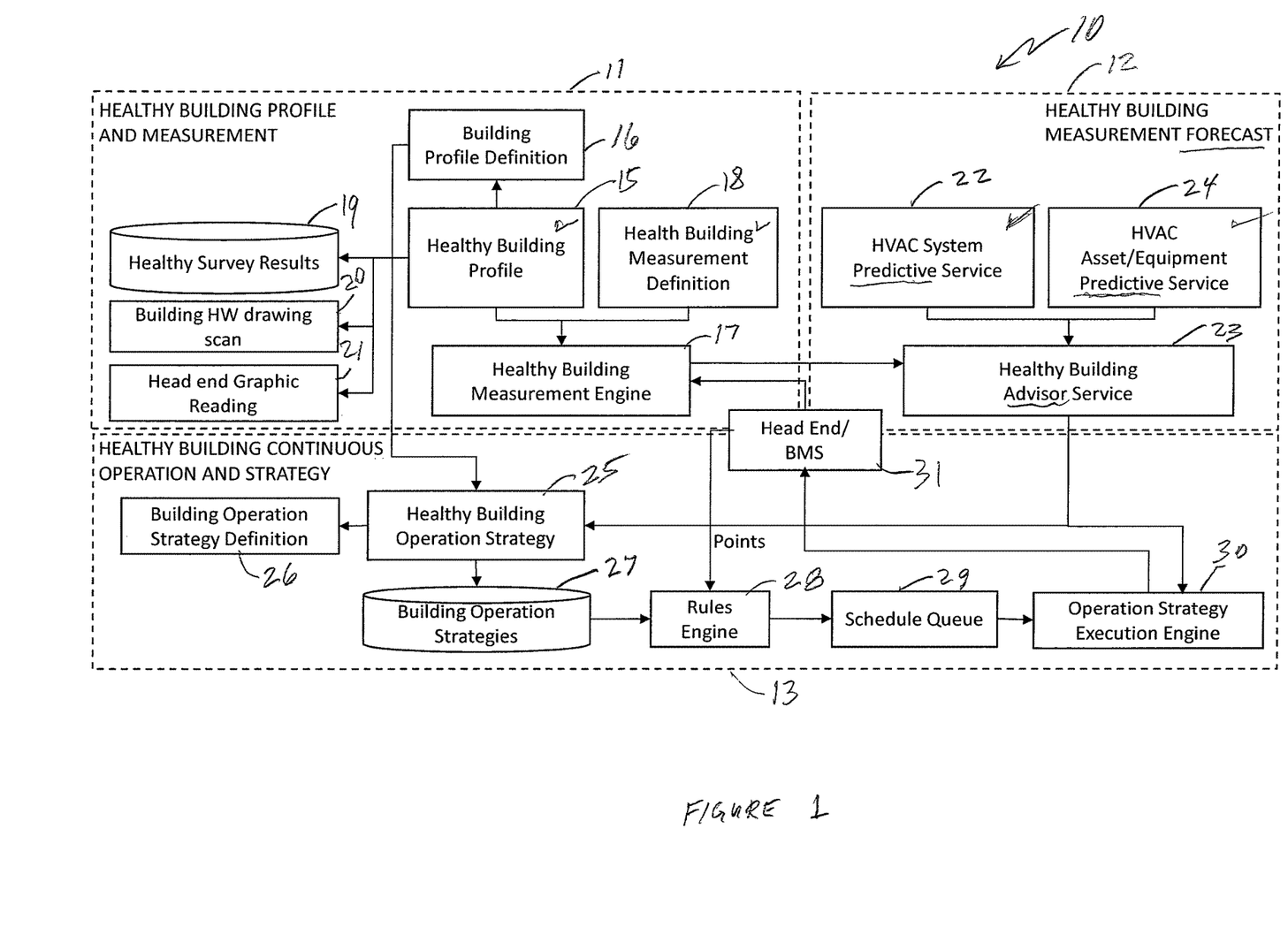
FIG. 1 is a diagram of a system that consists of an arrangement for achieving and monitoring healthy buildings.
Figure 2:
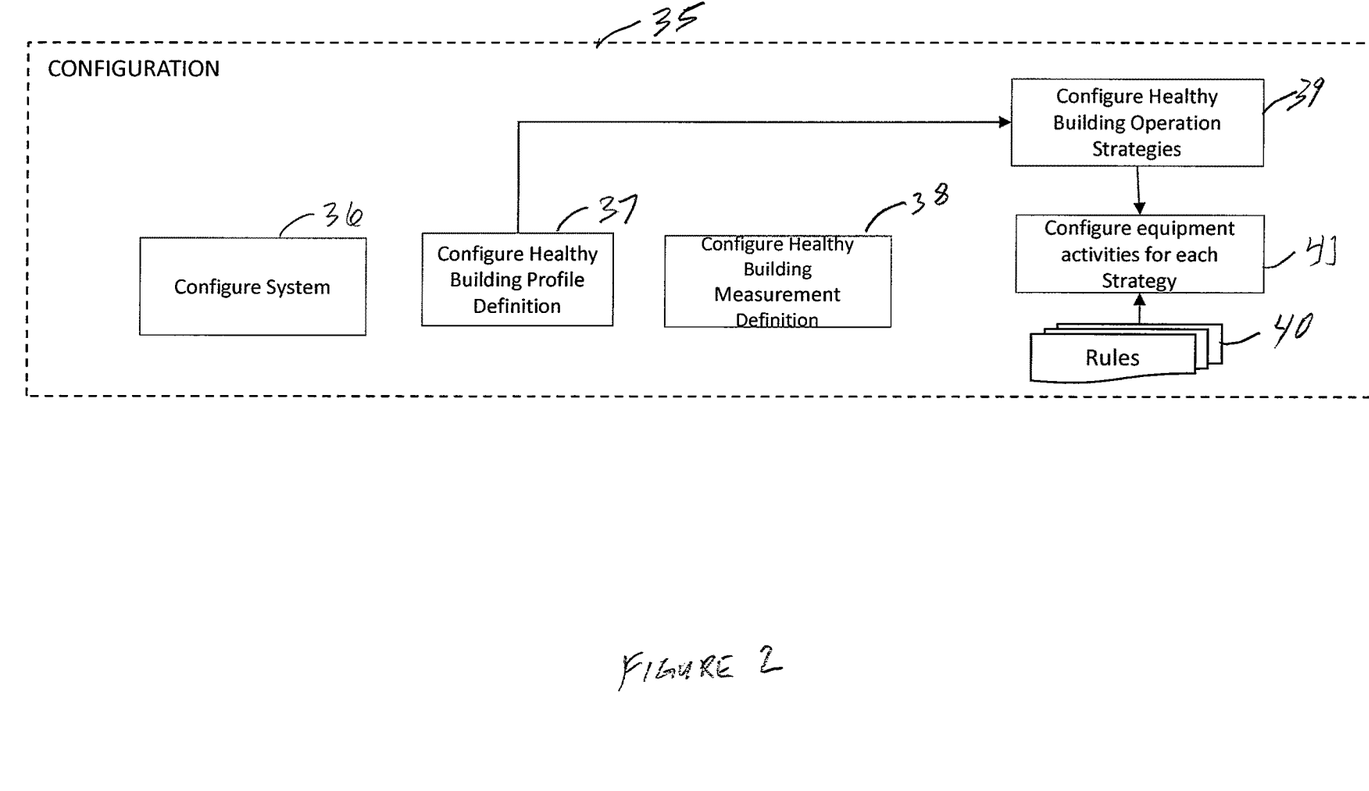
FIG. 2 is a diagram of a configuration of the present system in terms of steps.
Figure 3:
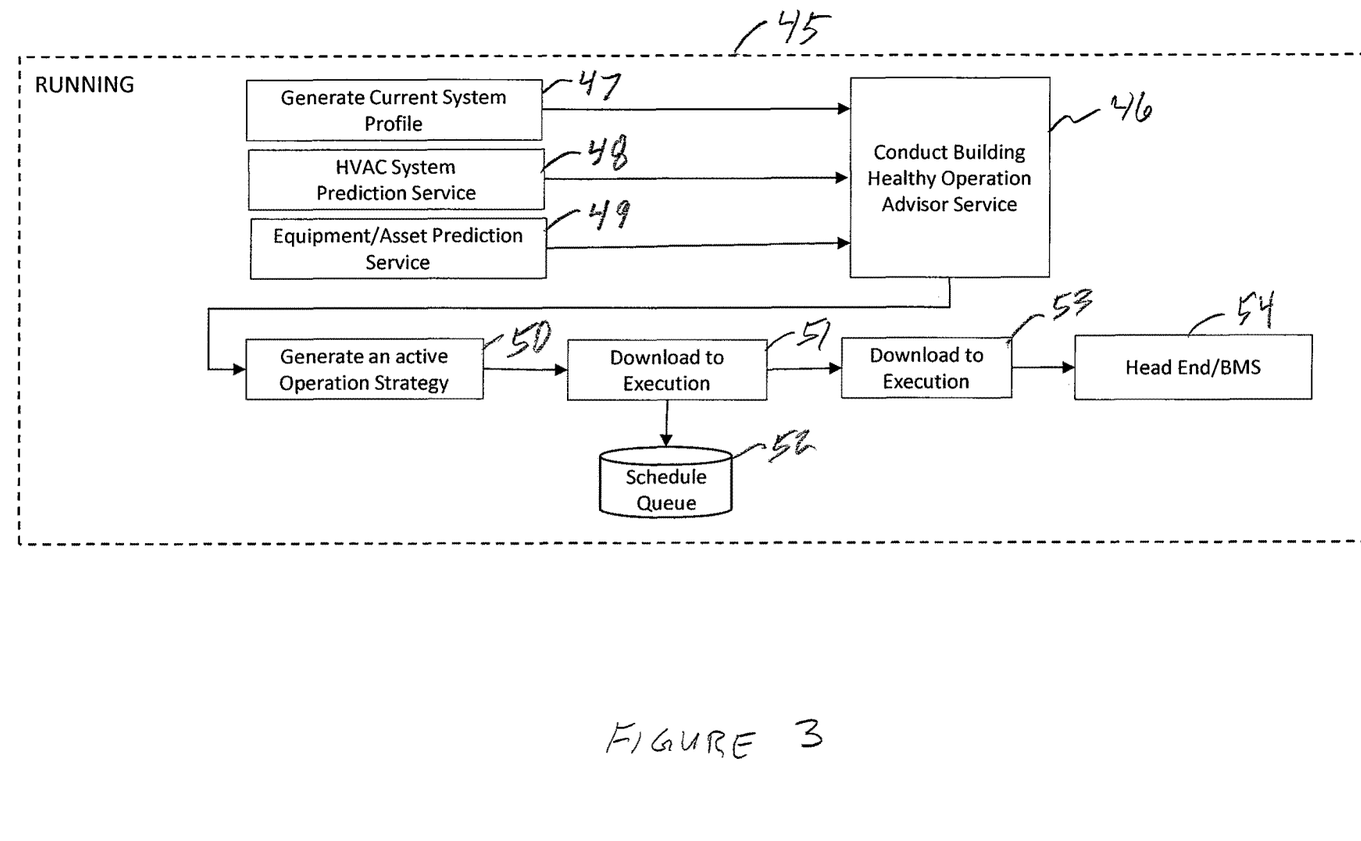
FIG. 3 is a diagram of an operating description of the present system

As to implementation, the diagrams may indicate a configuration and runtime of the present system and approach. FIG. 1 is a diagram of system 10 which may consist of a healthy building profile and measurement component 11, a healthy building measurement forecast component 12 and a healthy building continuous operation and strategy component 13. A healthy building profile module 15 may have an output to a building profile definition module 16, and an output to a healthy building measurement engine 17. A health building measurement definition module 18 may have an output to healthy building management engine 17. Healthy building profile module 15 may have an output to healthy survey results storage 19, a building hardware drawing scan module 20, and a head end graphic reading module 21.

An HVAC system predictive service module 22 may have an output to a healthy building advisor service module 23. HVAC asset/equipment predictive service module 24 may have an output to healthy building advisor service module 23. Also, an output from healthy building measurement engine 17 may go to healthy building advisor service module 23.

An output from building profile definition module 16 may go to a healthy building operation strategy module 25. An output from healthy building operation strategy module 25 may go to a building operation strategy definition module 26. An output from healthy building operation strategy module 25 may go to building operation strategies storage 27.

An output from building operation strategies storage 27 may go a rules engine 28. An output from rules engine 28 may go to a schedule queue module 29. From schedule queue 29 an output may go to operation strategy execution engine 30. An output from healthy building advisor service module 23 may go to healthy building operation strategy module 25 and operation strategy execution engine 30. An output from operation strategy execution engine 30 may go to a head end/BMS module 31. An output from the head end/BMS module 31 may go to rules engine 28 and another output from head end/BMS module 31 may go to healthy building measurement engine 17.

FIG. 2 is a diagram of a configuration 35 of the present system in terms of steps. One may configure a system at step 36. A healthy building profile definition may be configured at step 37. At step 38 a health building measurement definition may be configured. An output from step 37 may go to a step 39 where healthy building operation strategies are configured. With an output from step 39 and an output from a set of rules 40, equipment activities for each strategy may be configured at step 41.

FIG. 3 is a diagram of a running description 45 of the present system. Inputs to conduct building a healthy operation advisor service 46 may include generating a current system profile 47, an HVAC system prediction service 48 and an equipment/asset prediction service 49. From conducting building healthy operation advisor service 46, an output may go to generate an active operation strategy 50. An output from strategy 50 may go to download to execution 51 and then to a schedule queue storage 52. From execution 51 may be a download to execution 53. An output from execution 53 may go to head end/BMS 54.

To recap, a building health system may incorporate a healthy building profile measurement subsystem, a healthy building definition measurement subsystem, and an artificial intelligence (AI) enabled healthy building operation advisor service subsystem connected to a headend or building management subsystem (BMS). The healthy building profile measurement subsystem and the healthy building definition measurement subsystem may be connected to the headend or building management subsystem. The AI enabled healthy building operation advisor service subsystem may generate a healthy building measurement forecast operation strategy, generate operation guidelines including healthy operation performance indicators, building operation limits for the healthy building profile, and then trigger generation of an operation strategy for a healthy building as defined. The AI enabled healthy building operation advisor service subsystem may incorporate one more items selected from a group having rule engines, schedule queues, schedule execution engines, and active schedule subscriptions from schedule queues, getting schedule data and executing set points.

The AI enabled healthy building operation advisor service subsystem may have a continuous operation.

The system may further incorporate a building autonomous operation advisor service subsystem connected to the headend or BMS and adapted.

The building autonomous operation advisor service subsystem may generate performance metrics and operation limits, and provide real-time tracking and operation.

The system may further incorporate a cloud enabled online advisor service that an on premise building operation subsystem could subscribe.

The headend or BMS may be connected to the cloud enabled building operation advisory service subsystem.

The online advisor service may generate and confirm healthy operation performance metrics and operation guidelines, and notification limits. The online advisor service real-time may track system operations.

A remote service offline advisor service may initialize with building heating ventilation and air conditioning (HVAC) history operation data for a predetermined period of time. The offline advisor service may generate and confirm healthy operation performance metrics and operation guidelines, and notification limits. A remote operator may periodically or randomly sync with building HVAC operation data. The offline advisor service may real-time track and generate operation notifications. The remote operator may connect to the headend or BMS and apply changes as needed or desired by the remote operator.

A health building system may incorporate a building health profile and measurement module, a building health measurement forecast module connected to the building health profile and measurement module, a health building continuous operation and strategy module connected to the building health measurement forecast module, and a headend or building management system (BMS) connected to the building health profile and measurement module, the building health measurement forecast module, and the building health continuous operation and strategy module.

The system may further incorporate a heating, ventilation and air conditioning system (HVAC) connected to the headend or BMS.

The HVAC may depend on one or more factors selected from a group incorporating ventilation rates, airflow filtration, filter cleaning, and filter replacement.

A building inside air quality (IAQ) may be monitored so as to meet current ASHRAE COVID-19 guidelines. The IAQ may be monitored by the building health profile and measurement module.

The building health measurement forecast module may be artificial intelligence enabled, in that the building health measurement forecast module is based on a predicted HVAC system performance indicator, and on a predicted HVAC asset/equipment performance indicator.

An advisor service may generate building health measurement forecast operation guidelines per a predetermined profile and an operation strategy, and activate a new strategy to improve and maintain the IAQ.

A healthy building operation strategy may provide for a pre-check mode, running mode, and normal mode.

The system may further incorporate a rules engine to calculate a system health operation of an on/off operation mode.

Rules of the rules engine may define a default operation strategy, an active operation strategy, and backup operation strategies.

An approach for noting healthy buildings may incorporate profiling buildings in terms of a healthy indoor air quality (IAQ), defining healthy buildings, measuring health of buildings, continuously operating healthy buildings, and enabling with artificial intelligence a healthy building operation advisor service.

The approach may further incorporate operating a healthy building advisor service with a health effecting strategy.

The healthy building advisor may incorporate one or more items selected from a group having rule engines, schedule queues, schedule execution engines, active schedule subscriptions from schedule queues, schedule data and set points.

Any publication or patent document that may be noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building health system comprising:
   a heating, ventilation, and air conditioning (HVAC) system for a building including one or more sensors and one or more of: a heater, an air conditioner, a ventilator, a filter, a vent, a damper, and an actuator, for managing an indoor air quality of the building; and
   an artificial intelligence (AI) enabled indoor air quality building operation advisor service subsystem connected to the HVAC system including one or more of the sensors of the HVAC system, the AI enabled indoor air quality building operation advisor service subsystem:
     generates predicted indoor air quality equipment performance indicators for the HVAC system based at least in part on an output of one or more of the sensors of the HVAC system;
     generates an indoor air quality building measurement forecast based on the predicted indoor air quality equipment performance indicators;
     references indoor air quality guidelines;
     generates an operation strategy for the building to comply with the indoor air quality guidelines based at least in part on the indoor air quality building measurement forecast; and
     controls the HVAC system of the building in accordance with the operational strategy in order to comply with the generated indoor air quality guidelines; and
   the AI enabled indoor air quality building operation advisor service subsystem incorporates one or more items selected from a group comprising rule engines, schedule queues, schedule execution engines, active schedule subscriptions from the schedule queues, getting schedule data and executing set points.

2. The system of claim 1, wherein the AI enabled indoor air quality building operation advisor service subsystem has continuous operation.

3. The system of claim 1, wherein the AI enabled indoor air quality building operation advisor services subsystem comprises a building autonomous operation advisor service subsystem.

4. The system of claim 3, wherein the building autonomous operation advisor service subsystem generates performance metrics and operation limits, and provides real-time tracking and operation.

5. The system of claim 4, wherein the AI enabled indoor air quality building operation advisor services subsystem comprises a cloud enabled online advisor service that an on premise building operation subsystem could subscribe.

6. The system of claim 5, wherein the HVAC system is connected to the cloud enabled building operation advisory service subsystem.

7. The system of claim 6, wherein:
   the online advisor service generates and confirms indoor air quality operation performance metrics and operation guidelines, and notification limits; and
   the online advisor service real-time tracks building health system operations.

8. The system of claim 1, wherein:
   a remote service offline advisor service initializes using historical operation data of the HVAC system during a predetermined period of time;
   the offline advisor service generates and confirms indoor air quality operation performance metrics and operation guidelines, and notification limits;
   a remote operator periodically or randomly syncs with the HVAC system operation data;
   the offline advisor service real-time tracks and generates operation notifications; and
   the remote operator connects to the HVAC system and applies changes as needed or desired by the remote operator.

9. A health building system comprises:
   a building health profile and measurement module;
   a building health measurement forecast module connected to the building health profile and measurement module;
   a health building continuous operation and strategy module connected to the building health measurement forecast module; and
   a heating, ventilation, and air conditioning (HVAC) system including an HVAC controller and one or more sensors, the HVAC system further including one or more of: a heater, an air conditioner, a ventilator, a filter, a vent, a damper, and an actuator, for managing an indoor air quality of the building, connected to the building health profile and measurement module, the building health measurement forecast module, and the building health continuous operation and strategy module;
   wherein the building health measurement forecast module is configured to generate an indoor air quality forecast based on predicted equipment performance indicators for equipment of the HVAC system; and
   the controller of the HVAC system controls the HVAC system based at least in part on the indoor air quality forecast.

10. The system of claim 9, wherein the indoor air quality forecast depends on one or more of ventilation rates, airflow filtration, filter cleaning, and filter replacement.

11. The system of claim 9, wherein:
    the IAQ of at least part of the building is monitored by the building health profile and measurement module; and the controller of the HVAC system controls the HVAC system so that the IAQ of the at least part of the building meets a current ASHRAE indoor air quality COVID-19 guidelines.

12. The system of claim 9, wherein the building health measurement forecast module is artificial intelligence enabled, in that the building health measurement forecast module is based on a predicted HVAC system performance indicator, and on a predicted HVAC asset/equipment performance indicator.

13. The system of claim 12, wherein an advisor service generates building health measurement forecast operation guidelines per a predetermined profile and an operation strategy, and activates a new strategy to improve and maintain the IAQ.

14. The system of claim 12, wherein an indoor air quality building operation strategy provides for a pre-check mode, running mode, and normal mode.

15. The system of claim 12, further comprising a rules engine to calculate a system health operation of an on/off operation mode.

16. The system of claim 15, wherein rules of the rules engine define a default operation strategy, an active operation strategy, and backup operation strategies.

17. A method for autonomous operation of buildings comprising:
profiling buildings in terms of indoor air quality (IAQ) using an IAQ building profile measurement system;
defining the buildings using a building definition measurement subsystem;
measuring a health of the buildings;
continuously operating a building of the buildings;
enabling with artificial intelligence an indoor air quality building operation advisor service in communication with a heating, ventilation, and air conditioning (HVAC) system of the building, wherein the HVAC system of the building includes one or more sensors and one or more of: a heater, an air conditioner, a ventilator, a filter, a vent, a damper, and an actuator;
generating an indoor air quality building measurement forecast based on predicted equipment performance indicators for equipment of the HVAC system using the indoor air quality building operation advisor service;
generating indoor air quality operation performance metrics and operation limits using the indoor air quality building operation advisor service;
generating an operation strategy for the building; and
control the HVAC system of the building in accordance with the operation strategy for the building so that the building operates within the operation limits.

18. The method of claim 17, wherein the indoor air quality building advisor incorporates one or more of a rule engines, a schedule queue, a schedule execution engine, an active schedule subscription from one or more schedule queues, schedule data and one or more set points.

* * * * *